United States Patent
Seo

(10) Patent No.: US 10,064,206 B2
(45) Date of Patent: Aug. 28, 2018

(54) METHOD AND APPARATUS FOR ESTABLISHING RESOURCE POOL FOR SCHEDULING ASSIGNMENT SIGNAL OF DIRECT DEVICE-TO-DEVICE COMMUNICATION IN WIRELESS COMMUNICATION SYSTEM

(71) Applicant: LG ELECTRONICS INC., Seoul (KR)

(72) Inventor: Hanbyul Seo, Seoul (KR)

(73) Assignee: LG ELECTRONIC INC., Seoul (KR)

( * ) Notice: Subject to any disclaimer, the term of this patent is extended or adjusted under 35 U.S.C. 154(b) by 181 days.

(21) Appl. No.: 15/122,073

(22) PCT Filed: Feb. 24, 2015

(86) PCT No.: PCT/KR2015/001756
§ 371 (c)(1),
(2) Date: Aug. 26, 2016

(87) PCT Pub. No.: WO2015/130060
PCT Pub. Date: Sep. 3, 2015

(65) Prior Publication Data
US 2017/0019910 A1  Jan. 19, 2017

Related U.S. Application Data

(60) Provisional application No. 61/945,793, filed on Feb. 27, 2014, provisional application No. 61/951,513, (Continued)

(51) Int. Cl.
*H04W 4/00* (2018.01)
*H04W 72/12* (2009.01)
(Continued)

(52) U.S. Cl.
CPC .......... *H04W 72/12* (2013.01); *H04W 72/04* (2013.01); *H04W 76/10* (2018.02); *H04W 76/14* (2018.02)

(58) Field of Classification Search
CPC ..... H04W 72/04; H04W 72/12; H04W 76/02; H04W 76/10; H04W 76/14; H04W 4/005;
(Continued)

(56) References Cited

U.S. PATENT DOCUMENTS 9,730,174 B2 * 8/2017 Seo ................... H04W 76/14
2013/0322413 A1 12/2013 Pelletier et al.
(Continued)

FOREIGN PATENT DOCUMENTS

WO  WO 2013/077684 A1  5/2013

OTHER PUBLICATIONS

Ericsson, "Frame Structure for D2D-Enabled LTE Carriers," 3GPP TSG RAN WG1 Meeting #76, R1-140775, Prague, Czech Republic, Feb. 10-14, 2014, 3 pages.
(Continued)

*Primary Examiner* — Mohamed Kamara
(74) *Attorney, Agent, or Firm* — Birch, Stewart, Kolasch & Birch, LLP

(57) ABSTRACT

Disclosed in the present application is a method for a terminal transmitting a scheduling assignment (SA) for direct device-to-device communication in a wireless communication system. More specifically, the method comprises the steps of: determining whether data to be transmitted using the direct device-to-device communication is present; determining whether to transmit the SA according to a resource allocation mode for the direct device-to-device communication, when the data is not present; and transmitting a first SA when the resource allocation mode is a first mode, wherein the resource allocation mode includes the
(Continued)

first mode in which a resource for the direct device-to-device communication is allocated by a base station, and a second mode in which a resource for the direct device-to-device communication is allocated through a random selection by the terminal.

13 Claims, 11 Drawing Sheets

Related U.S. Application Data filed on Mar. 11, 2014, provisional application No. 61/968,338, filed on Mar. 20, 2014, provisional application No. 62/014,704, filed on Jun. 20, 2014, provisional application No. 62/021,679, filed on Jul. 7, 2014, provisional application No. 62/040,385, filed on Aug. 21, 2014.

(51) Int. Cl.
*H04W 76/10* (2018.01)
*H04W 72/04* (2009.01)
*H04W 76/14* (2018.01)

(58) Field of Classification Search
CPC ... H04W 4/008; H04W 72/048; H04W 84/18; H04W 12/08; H04W 8/26; H04W 72/02; H04W 72/005; H04W 28/022
See application file for complete search history.

(56) References Cited

U.S. PATENT DOCUMENTS

| | | |
|---|---|---|
| 2014/0286293 A1 | 9/2014 | Jang et al. |
| 2015/0358888 A1* | 12/2015 | Gulati .................. H04W 76/14 370/329 |
| 2016/0183276 A1* | 6/2016 | Marinier ............... H04W 72/02 370/329 |
| 2017/0048829 A1* | 2/2017 | Kim ......................... H04L 5/00 |

OTHER PUBLICATIONS

Ericsson, "On scheduling procedure for D2D," 3GPP TSG-RAN WG1 Meeting #76, R1-140778, Prague, Czech Republic, Feb. 10-14, 2014, 5 pages.

Ericsson, "Overview of D2D Scheduling," 3GPP TSG-RAN WG2 #85, Tdoc R2-140626, Prague, Czech Republic, Feb. 10-14, 2014, pp. 1/5-5/5.

Ericsson, "Synchronization Procedures for D2D Discovery and Communication," 3GPP TSG RAN WG1 Meeting #76, R1-140773, Prague, Czech Republic, Feb. 10-14, 2014, pp. 1/7-7/7.

3GPP, "3rd Generation Partnership Project; Technical Specification Group Radio Access Network; Study on LTE Device to Device Proximity Services; Radio Aspects (Release 12)", 3GPP TR 36.843, V1.2.0, Feb. 2014, XP050770871, pp. 1-40.

* cited by examiner (a) Control - Plane Protocol Stack (b) User - Plane Protocol Stack

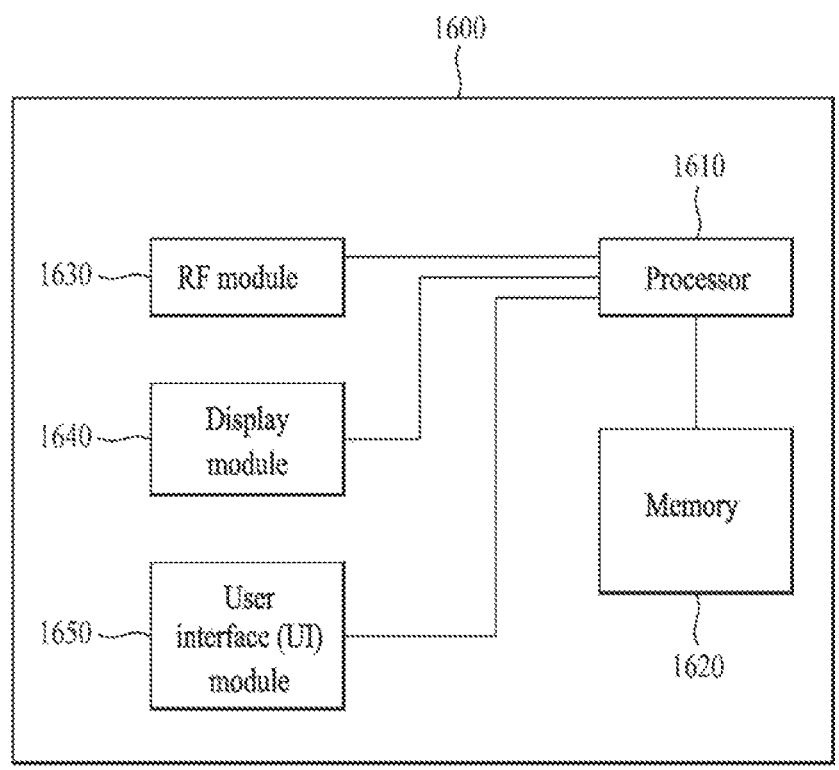

METHOD AND APPARATUS FOR ESTABLISHING RESOURCE POOL FOR SCHEDULING ASSIGNMENT SIGNAL OF DIRECT DEVICE-TO-DEVICE COMMUNICATION IN WIRELESS COMMUNICATION SYSTEM

CROSS REFERENCE TO RELATED APPLICATIONS

This application is the National Phase of PCT/KR2015/001756 filed on Feb. 24, 2015, which claims priority under 35 U.S.C. § 119(e) to U.S. Provisional Application Nos. 61/945,793 filed on Feb. 27, 2014; 61/951,513 filed on Mar. 11, 2014; 61/968,338 filed on Mar. 20, 2014; 62/014,704 filed on Jun. 20, 2014; 62/021,679 filed on Jul. 7, 2014; and 62/040,385 filed on Aug. 21, 2014, all of which are hereby expressly incorporated by reference into the present application.

TECHNICAL FIELD

The present invention relates to a wireless communication system, and more particularly, a method and apparatus for setting a resource pool for a scheduling allocation signal of device-to-device (D2D) communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for setting a resource pool for a scheduling allocation signal of device-to-device (D2D) communication in a wireless communication system.

Technical Solution

The object of the present invention can be achieved by providing a method of transmitting scheduling assignment (SA) for device-to-device (D2D) communication by a user equipment (UE) in a wireless communication system, the method including determining whether data to be transmitted is present using the D2D communication, determining whether the SA is transmitted according to a resource allocation mode for the D2D communication when the data is not present, and transmitting first SA when the resource allocation mode is a first mode, wherein the resource allocation mode includes the first mode in which resource for the D2D communication is allocated by a base station and a second mode in which resource for the D2D communication is allocated according to arbitrary selection of the UE Needless to say, when the resource allocation mode is the second mode, the UE may not transmit SA.

The method may further include transmitting second SA including information on resource for transmission of the data when the data is present, wherein the second SA may include information on an identifier of a reception UE. The first SA may include information indicating that data transmission corresponding to the first SA is not present.

The second SA may be repeatedly transmitted in a plurality of time resources and the first SA may be transmitted one time in one time resource.

The method may further include transmitting dummy data through resource indicated by the first SA when the first SA is transmitted.

The determining of whether the SA is transmitted may include driving a predetermined timer upon determining that the data is not present, and determining whether the SA is transmitted according to a resource allocation mode for the D2D communication when the timer does not expire, wherein the UE may not transmit SA when the timer expires.

In another aspect of the present invention, provided herein is a method of transmitting scheduling assignment (SA) for device-to-device (D2D) communication by a user equipment (UE) in a wireless communication system, the method including determining whether SA is transmitted in a previous SA period, determining whether resource for a data channel in a current SA period is changed when the SA is transmitted in the previous SA period, and transmitting the SA using resource of a first SA resource pool when the resource for the data channel is not changed, wherein, when the SA is not transmitted or the resource for the data channel is changed in the previous SA period, the SA may be transmitted using resource of a second SA resource pool.

The method may further include transmitting the SA indicating termination of transmission of the data channel using the resource of the second SA resource pool when the transmission of the data channel is terminated.

The SA may include information on whether the resource for the data channel is changed in a next SA period or information on the number of SA periods in which the resource for the data channel is not changed.

The number of resources included in the second SA resource pool may be greater than the number of resources included in the first SA resource pool and the first SA resource pool may precede the second SA resource pool in a time region.

Advantageous Effects

According to an embodiment of the present invention, a resource pool may be effectively allocated and a signal may be effectively transmitted and received for a scheduling allocation signal of device-to-device (D2D) communication.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 16 is a block diagram of a communication apparatus according to an embodiment of the present invention.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
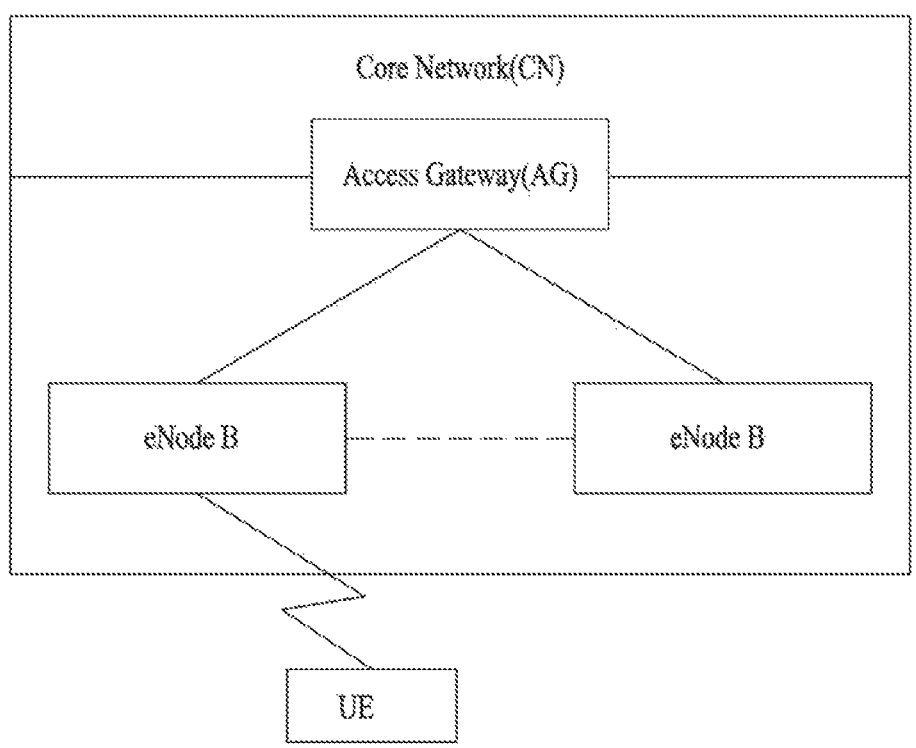
FIG. 1 illustrates a configuration of an Evolved Universal Mobile Telecommunications System (E-UMTS) network as an example of a wireless communication system.
Figure 2:
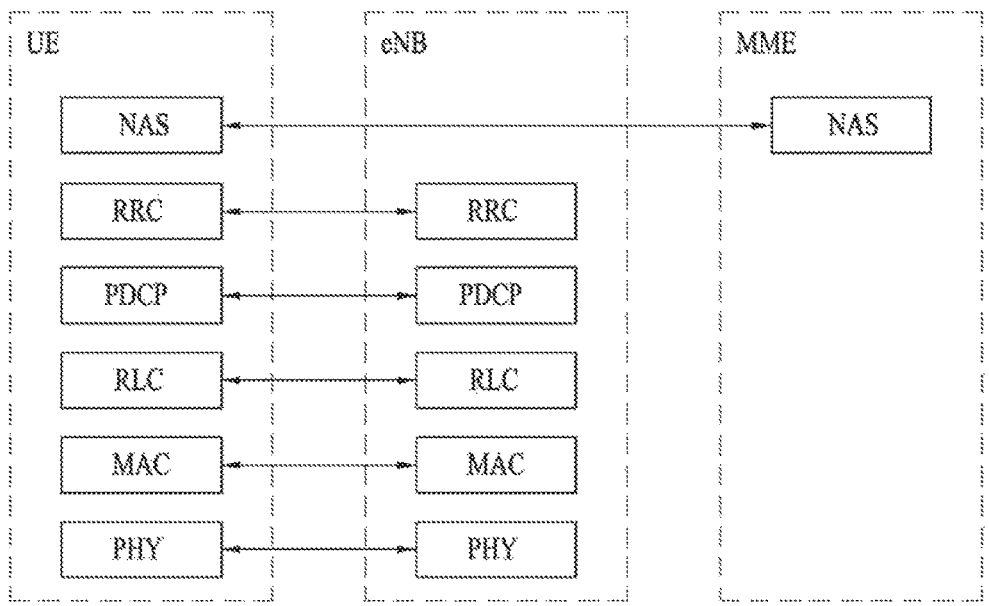
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
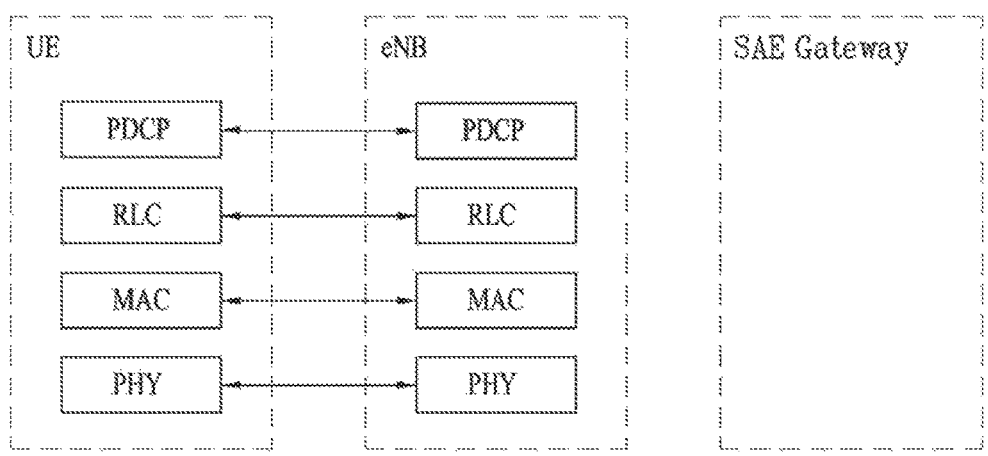

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
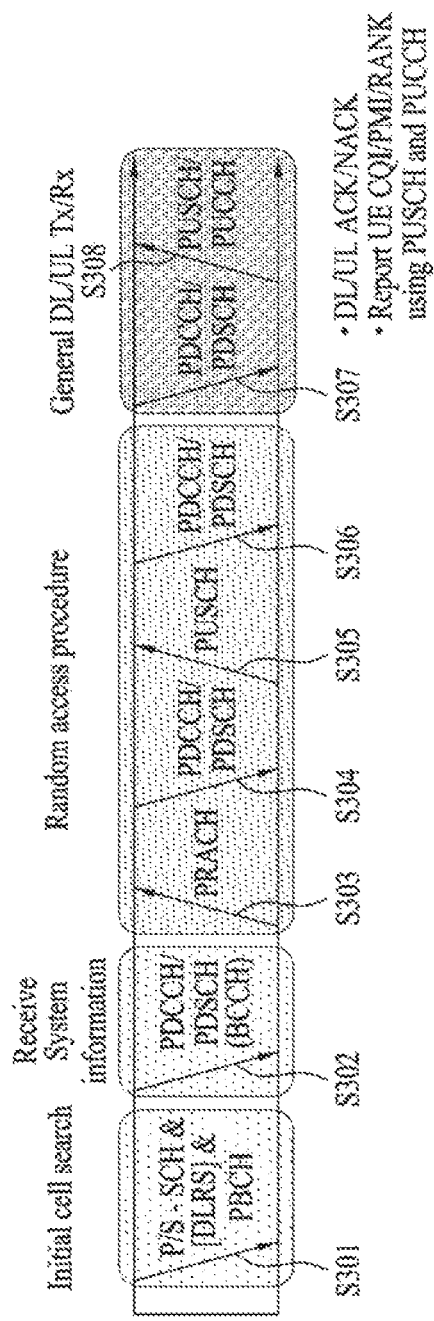
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
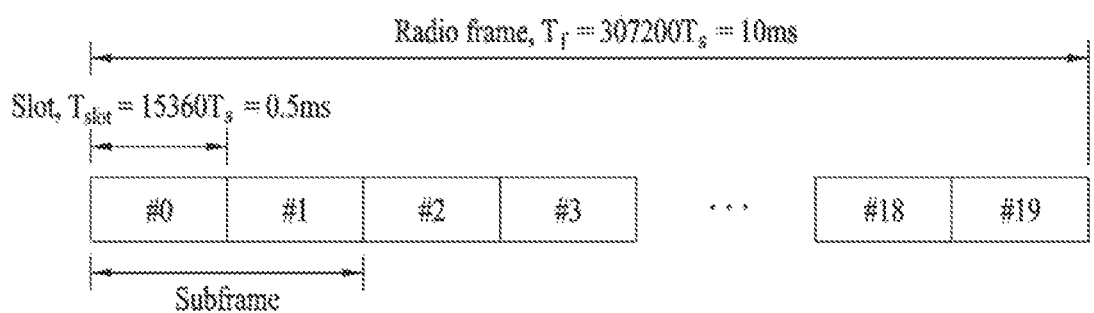
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
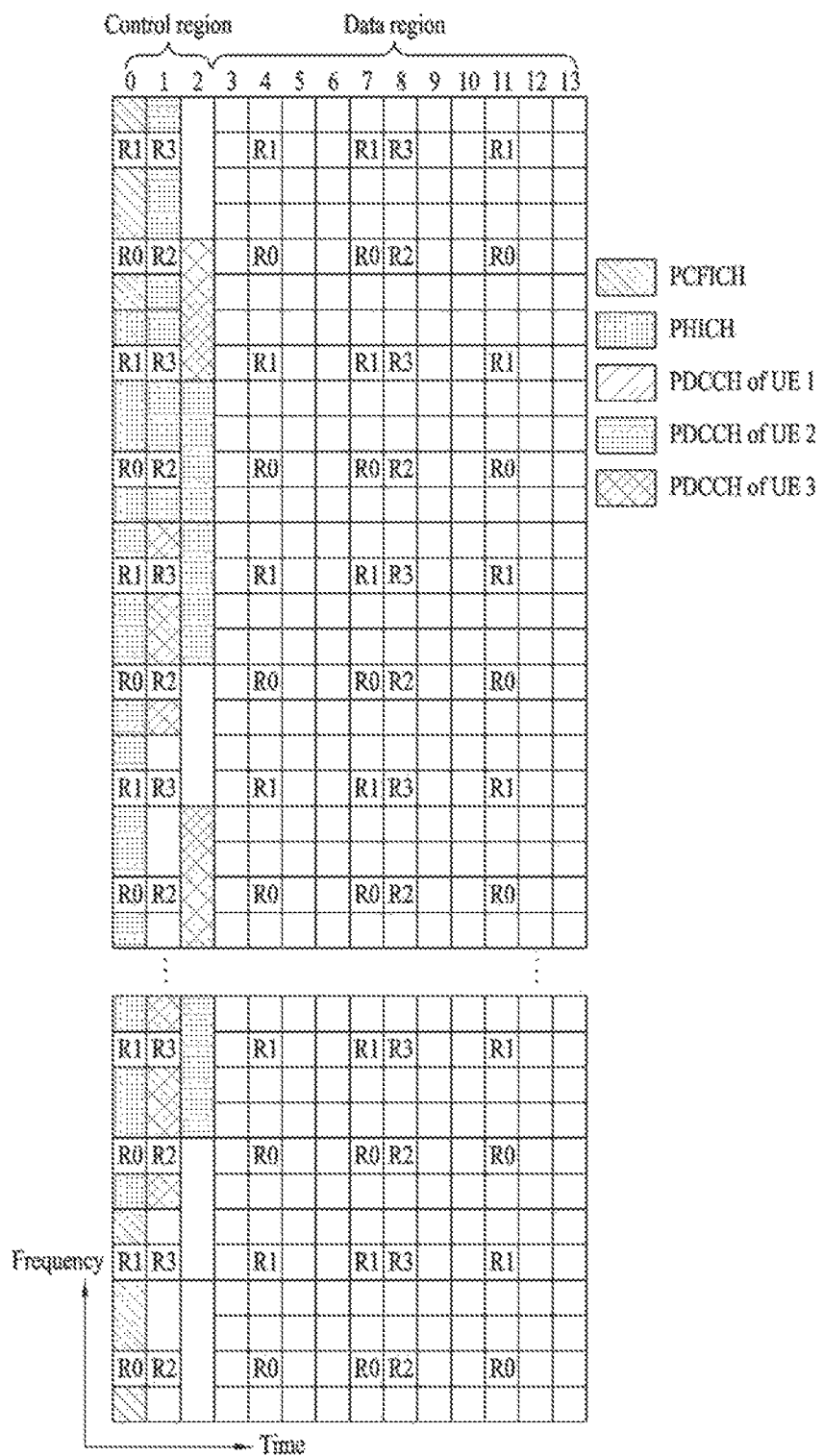
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
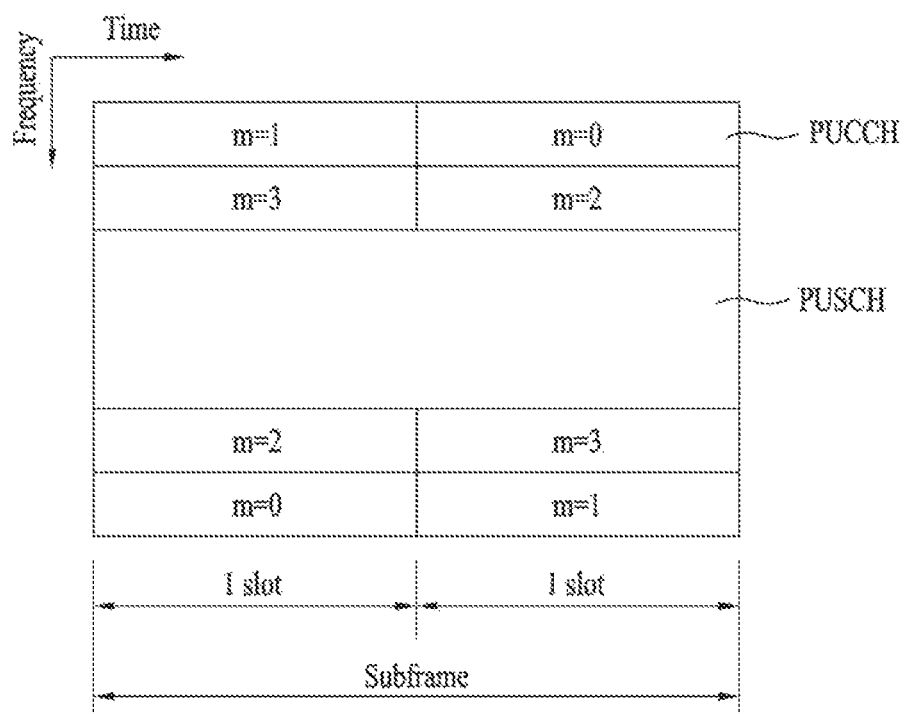
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
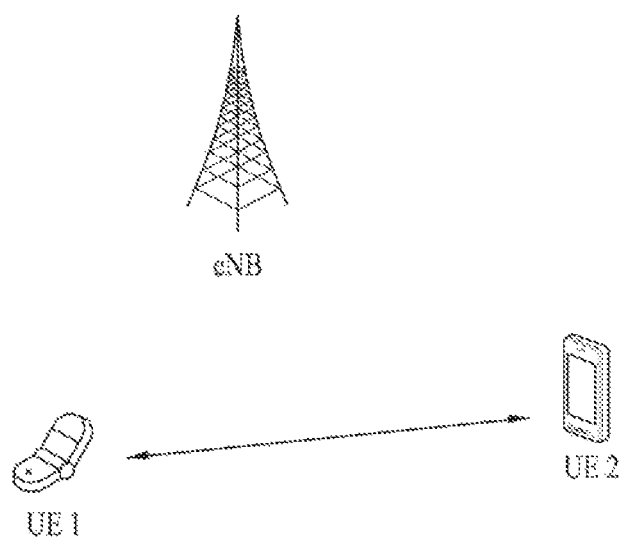
FIG. 7 is a diagram illustrating the concept of device-to-device (D2D) communication.

FIG. 7 is a diagram illustrating the concept of device-to-device (D2D) communication.

Referring to FIG. 7, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

In order to perform D2D operation, a UE performs a discovery procedure of determining whether a counterpart UE of D2D communication is located in a D2D communication area. Such a discovery procedure includes transmitting a unique discovery signal for identifying each UE and determining that the UE, which has transmitted the discovery signal, is located at a neighboring position when a neighboring UE detects the discovery signal. That is, each UE determines whether a counterpart UE of D2D communication is located at a neighboring position via the discovery procedure and then performs D2D communication for transmitting and receiving user data.

Meanwhile, the case in which UE1 selects a resource unit corresponding to specific resources in a resource pool indicating a set of resources and transmits a D2D signal using the corresponding resource unit will be described hereinbelow. Herein, the resource pool may be indicated to UE1 by an eNB when UE1 is positioned within coverage of an eNB and the resource pool may be indicated to UE1 by another UE or predetermined when UE1 is positioned out of coverage of the eNB. Generally, the resource pool consists of a plurality of resource units and each UE may select one or plural resource units to use the resource units to transmit a D2D signal thereof.

Figure 8:
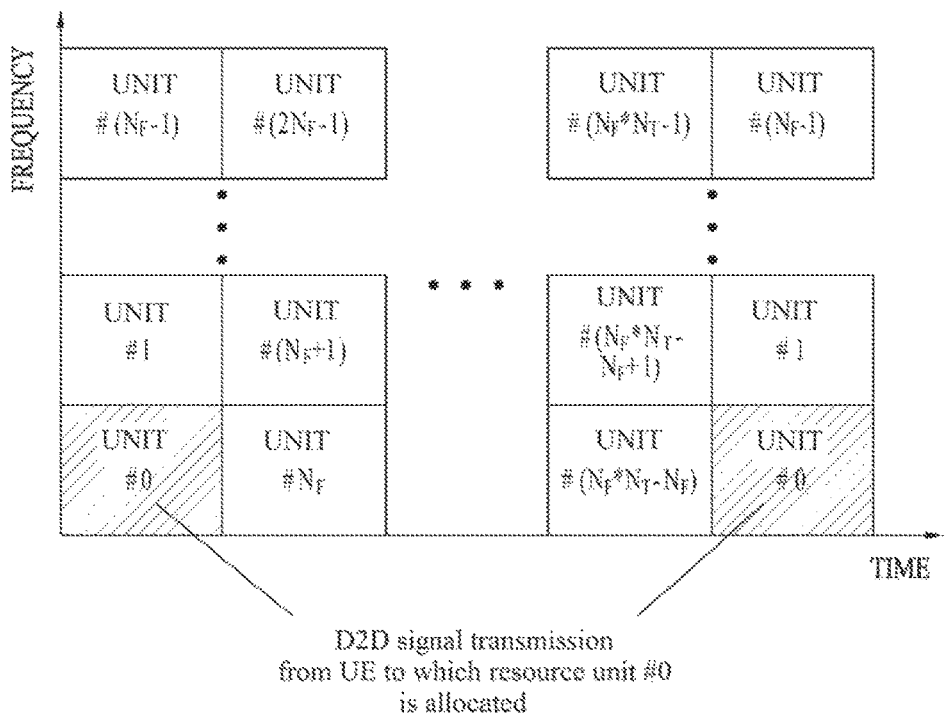
FIG. 8 illustrates an exemplary configuration of a resource pool and a resource unit.

FIG. 8 illustrates an exemplary configuration of a resource pool and a resource unit.

Referring to FIG. 8, all frequency resources are divided into $N_F$ frequency resources and all time resources are divided into $N_T$ time resources, thereby defining a total of ($N_F * N_T$) resource units. Particularly, a resource pool is repeated at a period of $N_T$ subframes. Characteristically, one resource unit may repeatedly appear in a periodic form. Alternatively, in order to gain a diversity effect in the time or frequency domain, an index of a physical resource unit to which one logical resource unit is mapped may be changed over time according to a predetermined pattern. In this resource unit structure, the resource pool may mean a set of resource units that can be used for transmission by a UE that desires to transmit a D2D signal.

The aforementioned resource pool may be subdivided into a plurality of types. First, the resource pool may be divided according to content of a D2D signal transmitted in the resource pool. For example, as in 1) to 3) below, the content of the D2D signal may be classified into SA, a D2D data channel, and a discovery signal and separate resource pools may be set according to respective contents.

1) Scheduling assignment (SA): The SA may refer to a signal including positional information of resource that is used for transmission of a subsequent D2D data channel by a transmission UE and information on a modulation and coding scheme (MCS) for demodulation of a D2D data channel or a MIMO transmission method. It may also be possible to multiplex and transmit the SA along with D2D data on the same resource unit and, in this case, the SA resource pool may refer to a pool of resource in which the SA is multiplexed and transmitted along with D2D data.

2) D2D data channel: The D2D data channel may refer to a channel that is used to transmit user data by a transmission UE. When the SA is multiplexed and transmitted along with the D2D data on the same resource unit, a resource element (RE) used to transmit SA information on a specific resource unit of the SA resource pool may be used to transmit the D2D data even in a D2D data channel resource pool.

3) Discovery signal: The discovery signal may refer to a resource pool for a signal for allowing a transmission UE to transmit information such as an ID of the transmission UE and a neighboring UE to discover the transmission UE.

When contents of D2D signals are the same, different resource pools may also be used according to transceiving attributes of a D2D signal. For example, despite the same D2D data channel or the same discovery signal, the resource pool may be re-classified into different resource pools according to a transmission timing determining method, a resource allocation method, and signal format of a D2D signal.

Here, the transmission timing determining method may be based on, for example, whether a D2D signal is transmitted at a receiving time point of a synchronization signal or whether predetermined timing advance (TA) is applied and a D2D signal is transmitted at a receiving time point of a synchronization signal. The resource allocation method may be based on, for example, whether an eNB determines a transmission resource of a separate D2D signal to a separate transmission UE or whether a separate transmission UE autonomously selects separate signal transmission resource in a resource pool. Lastly, the signal format may be, for example, the number of symbols that are occupied by each D2D signal in one subframe or the number of subframes used to transmit one D2D signal.

As described above, a UE that intends to transmit data via D2D communication may first select appropriate resource in an SA resource pool and transmit the SA using the selected resource. In this case, as a reference for selection of SA resource, SA resource associated with resource in which it is expected that the SA of other UEs is not transmitted and/or data of other UEs is not transmitted may be preferentially considered. In addition, a UE may select SA resource associated with data transmission resource that is expected to have a low interference level.

Figure 9:
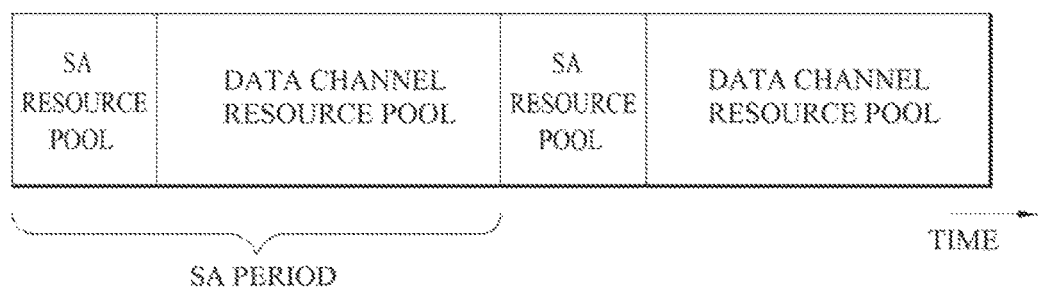
FIG. 9 is a diagram illustrating an example in which an SA resource pool and a D2D data channel resource pool periodically appear.

FIG. 9 is a diagram illustrating an example in which an SA resource pool and a D2D data channel resource pool periodically appear.

Referring to FIG. 9, the SA resource pool precedes the D2D data channel resource pool, a UE detects SA, and upon determining that data to be received by the UE according to information contained in the SA is present, the UE may attempt to receive data in resource associated with the SA. Hereinafter, a period in which the SA resource pool appears will be referred to as an SA period.

A UE that transmits SA in an SA resource pool of one SA period may transmit a D2D data channel using resource determined by the corresponding SA in D2D data channel resource pool. In this case, when the corresponding UE wants to continue to transmit the D2D data channel even at a time point in which next SA resource pool arrives, the UE needs to re-transmit the SA. This is because a UE that first attempts to receive SA may be present at a corresponding time point.

In this case, each UE may determine whether whole information indicated by resource used to transmit a D2D data channel, more generally, SA is changed or retained in a new SA period. In particular, when all UEs determine to change resource to be used every SA period, new resource contention during a procedure of changing resource and a D2D data channel may be transmitted while a plurality of UEs interfere with each other in the same resource. In this case, while some UEs do not change resource, when only other some UEs change resource, possibility of resource contention may be lowered because the UE that changes resource recognizes a position of resource of the UEs that do not change resource. Whether resource is changed every SA period may be stochastically determined by each transmission UE or resource change may be periodically attempted for each UE with predetermined period and offset.

The present invention proposes that a resource pool is divided into a resource pool (hereinafter, SA resource pool #1) that is used to transmit SA by a UE that does not change resource and a resource pool (hereinafter, SA resource pool #2) that is used to transmit SA by a UE that changes resource when only some of UEs, which transmit SA in an SA period, change resource and transmit SA in a current SA period. In more general, a resource pool may be divided into SA resource pool #1 that is used to transmit SA by a UE that does not change entire information transmitted by SA and SA resource pool #2 that is used to transmit SA by a UE that changes at least some of information transmitted by SA.

In particular, a UE that first attempts to transmit SA in one SA period may be determined to use SA resource pool #2. That is, a UE that does not transmit SA in a previous SA period may use SA resource pool #2. Exceptionally, a UE that first attempts to transmit SA in one SA period may be permitted to use SA resource pool #1. For example, a UE that previously transmits SA is not present at a time point in which a corresponding SA resource pool is first set and, thus, a UE that attempts to transmit SA may be permitted to use SA resource pool #1. In particular, a UE that sets an SA resource pool, for example, a UE that transmits a synchronization signal for corresponding D2D and sets a reference of the SA resource pool may be applied to this exception.

One SA resource pool that appears in one SA period may be divided into SA resource pool #1 and SA resource pool #2 and, in this case, SA resource pool #1 may precede SA resource pool #2. This is because UEs that newly attempts to transmit SA in a corresponding SA period needs to first observe SA resource pool #1, to recognize resource occupied by UEs that do not change at least resource, to determine resource to be used by the UEs so as to prevent the recognized resource from interfering, and to transmit SA of the UEs using SA resource pool #2.

Figure 10:
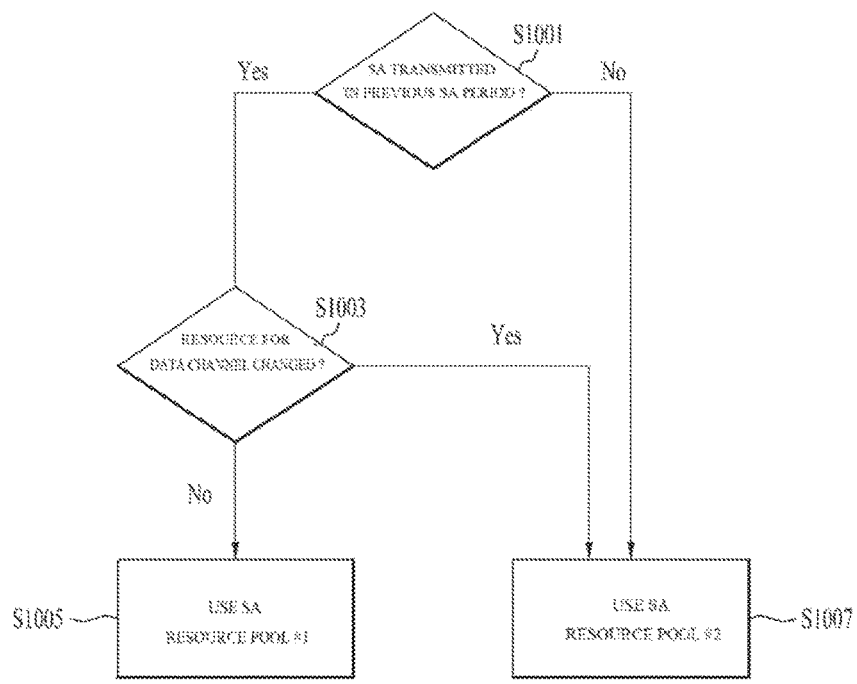
FIG. 10 is a diagram illustrating an example in which a plurality of SA resource pools is managed according to an embodiment of the present invention.

FIG. 10 is a diagram illustrating an example in which a plurality of SA resource pools is managed according to an embodiment of the present invention.

Referring to FIG. 10, in operation 1001, a UE determine whether SA is transmitted in a previous SA period. When the SA is transmitted in a previous SA period, whether resource for a current D2D data channel is changed as in operation 1003. When the resource for the current D2D data channel is not changed, the SA is may be transmitted using SA resource pool #1 as in operation 1005.

On the other hand, when SA is not transmitted in a previous SA period or the resource for the current D2D data channel is changed even if the SA is transmitted in a previous SA period, the SA may be transmitted using SA resource pool #2 as in operation 1007.

Figure 11:
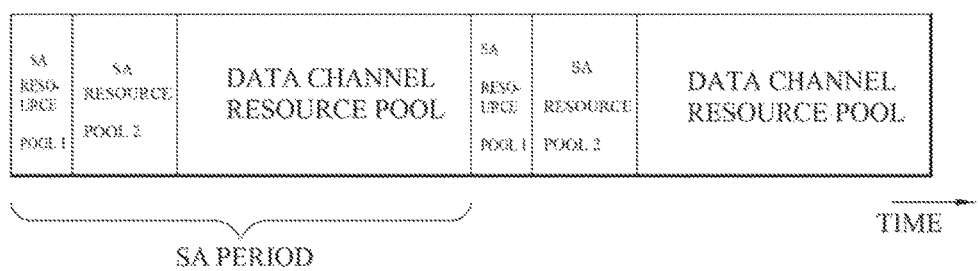
FIG. 11 is a diagram illustrating an example of a configuration of an SA resource pool and a D2D data channel resource pool according to an embodiment of the present invention.

FIG. 11 is a diagram illustrating an example of a configuration of an SA resource pool and a D2D data channel resource pool according to an embodiment of the present invention. As seen from FIG. 11, the SA resource pool of one SA period may be divided into SA resource pool #1 and SA resource pool #2.

Figure 12:
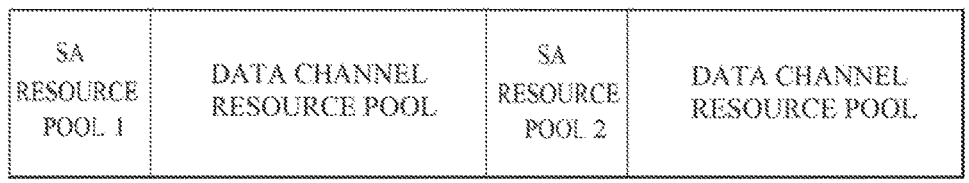
FIG. 12 is a diagram illustrating another example of a configuration of an SA resource pool and a D2D data channel resource pool according to an embodiment of the present invention.

FIG. 12 is a diagram illustrating another example of a configuration of an SA resource pool and a D2D data channel resource pool according to an embodiment of the present invention.

As seen from FIG. 12, one SA resource pool may be used as SA resource pool #1 and another SA resource pool may be used as SA resource pool #2. In this case, SA transmitted in one SA resource pool #1 (or one SA resource pool #2) may be considered to be valid until next SA resource pool #1 (or one SA resource pool #2) appears.

Although not illustrated in FIGS. 11 and 12, SA resource pool #1 and SA resource pool #2 may be differentiated in a frequency region. As necessary, SA resource pool #1 may be omitted which means that all SA resource pools are interpreted as SA resource pool #2 and a transmission UE can change resource to be transmitted every SA period.

Alternatively, this means that, when SA resource pool #1 is omitted, transmission is implicitly performed in SA resource pool #1. In more detail, a UE that determines to maintain existing SA content may not transmit all SAs in a specific SA period in which SA resource pool #1 is omitted, that is, in a situation in which only SA resource pool #2 is present. Then, existing UEs that do not receive transmission of all SAs from a corresponding UE in SA resource pool #2 may consider that the corresponding UE maintains SA content and continue to receive a D2D data channel.

In order to smoothly perform the aforementioned operation based on the divided SA resource pool, each SA may include an indicator indicating whether the corresponding SA is also retained in a next SA period. In this case, when other UEs recognize that the SA is also retained in a next period, even if SA detection of a corresponding UE in a next SA period fails, the corresponding UEs may recognize that SA is retained and continue to receive SA.

In addition, each SA may include an indicator indicating the number of SA periods in which the corresponding SA is to be retained. Simultaneously, when the number of D2D UEs that attempt to transmit data is limited and, thus, an SA resource pool with a sufficient size is formed using even a relatively small amount of resource, an operation of dividing an SA resource pool into two parts as in the aforementioned operation may unnecessarily restrict dynamic change in SA resource. In this case, only a single SA resource pool may be managed, SA resource pool #1 may be omitted, and all SA resources may be considered to be used as SA resource pool #2, as described above.

The aforementioned indicator indicating whether SA is also retained in a next SA period or the indicator indicating the number of SA periods in which the corresponding SA is to be retained may not be necessarily transmitted in SA. For example, the indicator may be transmitted using some fields of data scheduled by the SA. In this case, a UE may preferentially receive the SA, receive a D2D data channel according to the SA, read a corresponding field, and recognize whether the same UE also transmits data in the same resource in a next SA period. Accordingly, other UEs may avoid the resource and set transmission resource of the UEs, thereby preventing resource contention of data.

The same principle may be applied by differently setting a period to which SA is applied. For example, a specific UE may operate in such a way that SA transmitted in SA period #n indicates data transmission of period #(n+k) instead of data transmission of period #n. Another UE that receives this may recognize data resource in period #(n+k) of the corresponding UE in period #n and, thus, the UE may avoid resource of the corresponding UE in SA of period #(n+k−m) and determine data resource in resource #(n+k) of the UE while using an interval between SA and a data period as m. To this end, how far away a period of data scheduled by the corresponding SA is may be indicated by the indicator of the SA or D2D data channel. The indicator may be obviously included in the SA or data or may be embodied using an implicit method such as format of the SA, a CRC mask, a resource position of the SA, and an index of a resource pool for transmitting the SA.

Typically, SA resource pool #1 may be configured with a smaller amount of resources than SA resource pool2. This is because, since only UEs that do not change a resource position transmit SA in SA resource pool #1, additional resource contention does not occur and a predetermined operation for overcoming resource contention, for example, an operation of randomly selecting a time point of transmitting SA resource is not required. Directly, SA resource pool #1 may be configured with only time in which only one time SA transmission is permitted or only time in which one SA is repeatedly transmitted. On the other hand, since a UE that changes resource and UEs that newly transmit SA need to dispersively select transmission resource without previous information in SA resource pool #2, resource contention may occur and sufficient SA resources for a predetermined operation for overcoming resource contention may be required.

Figure 13:
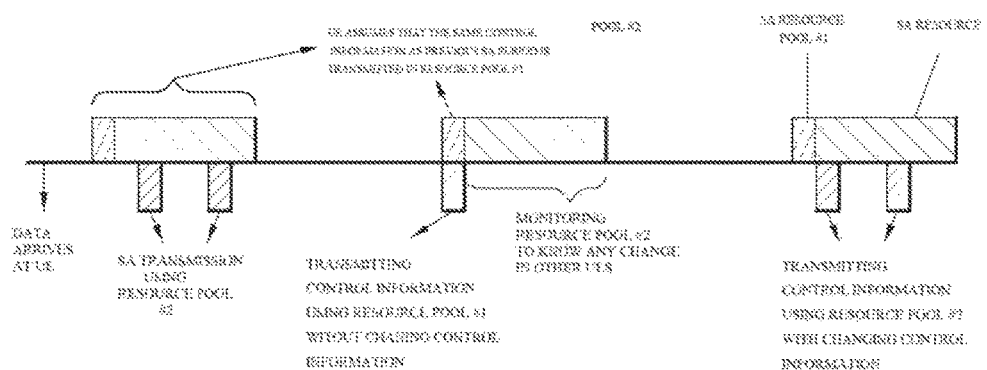
FIG. 13 is a diagram illustrating an example of an operation of transmitting SA by a UE in SA resource pool #1 and SA resource pool #2 according to an embodiment of the present invention.

FIG. 13 is a diagram illustrating an example of an operation of transmitting SA by a UE in SA resource pool #1 and SA resource pool #2 according to an embodiment of the present invention.

Referring to FIG. 13, new data arrives at a corresponding UE prior to a first SA period and, accordingly, SA resource pool #2 is used in the first SA period. In this case, as described above, resource contention may occur in SA resource pool #2 and the SA transmission UE needs to receive transmission SA of another UE at a time point in which the SA transmission UE does not perform transmission. Accordingly, when SA is transmitted in SA resource pool #2, SA may be transmitted using two or more opportunities for SA transmission.

The aforementioned operation for avoiding resource contention may be applied in SA resource pool #2. For example, each UE may stochastically determine a time point for transmitting SA in SA resource pool #2, recognize SA transmitted prior to the corresponding time pint, and adjust SA resource of the time pint determined by the corresponding UE. In this case, in order to ensure a plurality of SA transmission numbers of times in SA resource pool #2, the stochastic SA transmission time point may be applied to determination of first SA transmission time point, a second SA repetition time point or thereafter may also be stochastically determined or may be determined according to a predetermined rule according to the first SA transmission time point. Alternatively, SA resource pool #2 may be divided into two or more parts and a UE may select one resource from each part and perform transmission.

Then in a second SA period, a UE may determine not to change SA and may transmit SA in SA resource pool #1. When SA resource pool #1 is used, it is not necessary to receive an SA transmission signal of another UE that uses SA resource pool #1 and, thus, only one time SA transmission may be sufficient. In this case, a UE may assume that SA having the same content as SA received in a previous SA period is repeated in SA resource pool #1. In order to widen SA coverage due to additional SA transmission, SA having the same content may be permitted to be repeatedly transmitted using SA resource pool #2.

Lastly, a UE may determine to re-change SA and transmit the SA using SA resource pool #2 in a third SA period.

When a specific UE transmits SA in SA resource pool #1, it may not be possible that the specific UE receives SA of another UE that transmits SA in SA resource pool #1 simultaneously with SA transmission in SA resource pool #1. However, when another UE transmits SA in SA resource pool #1, this means that the corresponding UE does not change information of SA, and when another UE changes information of SA, the corresponding UE needs to use SA resource pool #2 instead of SA resource pool #1.

Accordingly, a UE that transmits SA in SA resource pool #1 previously receives SA that is previously transmitted by another UE and does not receive SA that is transmitted by the corresponding another UE in SA resource pool #2 of a specific SA period, the corresponding another UE may be assumed to continue D2D data channel transmission according to determination of previous SA. As a result, even if SA is transmitted in SA resource pool #1, a problem in that SA of another UE, transmitted in the same SA resource pool #1, is not received may be overcome.

When a UE wants to terminate D2D data channel transmission, SA indicating termination of D2D data channel transmission may be transmitted in SA resource pool #2. A UE that receives the SA may recognize that the corresponding UE does not use existing resource any longer.

At a time point in which an SA resource pool of a new SA period is reached, data to be transmitted by a UE may not be present. The case in which the data is not present may refer to a case in which entire D2D traffic is not present or a case in which traffic of a predetermined level or less is present. In this case, if the corresponding UE does not transmit entire SA, it may not be possible to immediately transmit data when data is re-generated immediately and a problem in that the UE needs to wait for a next SA period may arise.

However, when the waiting time does not largely affect capability of D2D communication, this may be one alternative for preventing unnecessary transmission of SA. On other hand, when the corresponding UE always transmits SA even if data is not present, a problem in that other UEs unnecessarily empty corresponding resource. In this case, when a UE that needs to perform very urgent D2D communication, for example, a UE installed in a vehicle intends to notify another vehicle approaching the UE at high speed of occurrence of an emergency state of the UE so as to prevent an accident, SA may be permitted to be always transmitted even if data is not present as a method for urgent communication despite resource inefficiency.

As a compromise operation of the drastic cases, a UE may drive a predetermined timer when data to be transmitted is not present, may always transmit SA to prepare immediate generation of data before the corresponding timer expires, and may not transmit SA until new data appears despite a new SA period after the corresponding timer expires. When new data appears after the timer expires, the corresponding UE may wait for a closest SA period and then transmit SA of the UE using SA resource pool #2.

As one type of the timer, the UE may be permitted to transmit SA without data transmission up to maximum of M SA periods when data to be transmitted is not present, whereas the UE may not be permitted to transmit SA any longer when new data does not appear from an $(M+1)^{th}$ SA period.

An operation may be determined among the aforementioned operation according to a type of a UE or a type of D2D traffic to be transmitted by the UE, in particular, an urgent degree thereof and a value of used M may be differently set according to a type of each UE or a type of D2D traffic. The determination and the setting of the M value may be determined by an eNB.

In particular, an operation of determining whether SA is transmitted when data to be immediately transmitted is no present at a current time point may be differently determined according to a structure of allocating resource for D2D transmission. A resource allocation method for D2D transmission may be divided into two modes below.

Mode 1 is a method of directly determining resource to be used to transmit SA and D2D data to a separate UE by an eNB. As a result, the eNB may accurately recognize a UE and resource used for D2D transmission. However, when an eNB determines D2D resource every D2D signal transmission, excessive signaling overhead may be caused and, thus, a plurality of SAs and/or data transmission resources may be allocated through one time eNB signaling.

Mode 2 is a method in which a separate transmission UE selects appropriate resource in predetermined SA and resource pool that are set to a plurality of transmission UE by an eNB and transmits the SA and the data. As a result, the eNB may not accurately recognize a UE and resource used for D2D transmission.

With regard to even D2D traffic having the same delay requirement, a method of determining whether SA is transmitted when D2D data is not present may be changed according to a mode applied to a specific transmission UE from the aforementioned two modes.

In the case of Mode 1, in generally, the eNB may allocate specific SA resource to only a specific transmission UE and may not allocate the corresponding resource to another UE positioned around at least the corresponding transmission UE. Accordingly, even if a UE that is allocated SA resource through mode 1 does not use the corresponding resource in SA transmission, it may be difficult that another UE increases resource utilization using the corresponding resource and possibility that the corresponding resource is wasted may be high. In this case, even if D2D traffic to be transmitted is not present, the corresponding UE may transmit SA through resource allocated by an eNB so as to prepare D2D data transmission that occurs in future, thereby facilitating enhancement in resource utilization.

In the case of Mode 1, an eNB needs to know whether a resource allocation signal transmitted by the eNB is appropriately received by a UE in order to perform an operation of retransmitting the resource allocation signal or allocating resource for D2D communication of another UE or PUSCH transmission in next resource allocation when reception of the resource allocation signal fails. In this case, when a UE does not receive the resource allocation signal, the UE may not transmit SA and, thus, an SA signal transmitted by the UE may be directly considered as report indicating that the resource allocation signal of the eNB is received. Accordingly, for the aforementioned operation, even if D2D data is not present, the UE may operate to transmit SA for reception of the eNB.

In the case of Mode 2, in particular, in the case of D2D traffic that is not sensitive to delay, when D2D traffic is not present, a UE may operate not to transmit SA. This is because, when SA is not transmitted, resource allocation between UEs is dispersively allocated and, thus, possibility of SA resource contention is lowered in a situation of Mode 2 in which possibility of SA resource contention is not basically avoided.

SA transmitted when there is no D2D traffic may be differentiated from SA transmitted in a general case in which there is D2D traffic, and in particular, as described above, this may be applied when Mode 1 is used. For example, in order to indicate that subsequent D2D data transmission is not be present, the SA transmitted when there is no D2D traffic may include an indicator indicating whether subsequent D2D data transmission is present. Alternatively, an ID of a reception UE, included in the SA transmitted when there is no D2D traffic, may be set to a specific state, for example, a state in which the ID is not used as an ID of any reception UE and, thus, UEs that receive the ID may not attempt to receive data in a data region.

Alternatively, D2D data time or frequency resource size included in SA may be allocated with 0 so as not to map any data and, thus, SA reception UEs may recognize this fact. Only a demodulation reference signal (DM-RS) of SA may be transmitted such that an eNB detects the DM-RS and recognizes reception of an appropriate resource allocation signal of a corresponding UE and, in this case, content of the SA may not be transmitted so as to reduce power consumption of the UE.

When SA with the same content is repeatedly transmitted twice or more in order to transmit sufficient energy, if D2D data traffic is not present, only some subframes (e.g., only subframes in which SA with the same content is first transmitted) may transmit the SA. This is because, in the case of Mode 1, it is sufficient that only an eNB receives SA and recognize whether an appropriate resource allocation signal is received and, thus, unnecessary transmission for an eNB may be stopped in the other subframes and power consumption may be reduced.

In particular, in the case of Mode 1, even a UE without D2D data traffic may also transmit a predetermined signal in data resource connected to SA when the SA is transmitted. This is because whether resource allocation information is appropriately received may be determined based on data transmission instead of SA according to an embodiment of an eNB. In this case, the UE may not have data to be actually transmitted and, thus, may transmit arbitrary dummy data as D2D data. Alternatively, it may be possible to transmit only a DM-RS of D2D data, which may be interpreted as if transmission power of dummy data except for an RS is 0.

In a normal case, the UE may first transmit SA to notify another UE of resource for transmitting a D2D data channel of the UE and, then, may transmit the D2D data channel. However, as necessary, SA may not be partially or completely transmitted. For example, when the UE transmits a signal to an eNB at a time point for SA transmission, one UE cannot simultaneously transmit two signals and, thus, SA transmission with relatively low priority may be stopped signal transmission to the eNB may be performed. As another example, resource corresponding to an SA resource pool may be used in other purposes, for example, in order to transmit a synchronization signal and a synchronization channel for synchronization between D2D terminals. When it is not possible to transmit SA, an operation to be appropriately performed by a UE may be defined so as to perform a D2D operation even in a signal can be transmitted to the eNB.

First, it may be assumed that a specific UE intends to transmit in SA resource pool #1 but cannot transmit SA for the aforementioned reason. In this case, it may be interpreted as if the corresponding UE does not intend to change SA content and, thus, even if SA is not transmitted, any problem does not arise with regard to at least UEs that previously receive SA of a corresponding UE. Under the assumption, when each UE intends to transmit SA in SA resource pool #1 but cannot transmit SA, the UE may not simply transmit SA and may continue transmit a D2D data channel according to the previously transmitted SA. On the other hand, a problem in that SA cannot be transmitted to UEs that newly attempt reception may arise. In order to overcome the problem, when each UE intends to transmit SA in SA resource pool #1 but cannot transmit SA, the corresponding UE may use SA resource pool #2.

Whether an operation is selected from the two operations may be controlled according to a frequency at which a UE that newly attempts reception appears and may be predetermined according to attributes of a target service. When SA can be transmitted twice or more in one SA resource pool, the case in which 'UE cannot transmit SA' may be interpreted as the case in which 'any one of SAs to be transmitted a plurality of numbers of times cannot be transmitted' in the aforementioned operation so as to always ensure a predetermined number of times of SA repeat transmission. Alternatively, the case in which 'UE cannot transmit SA' may be interpreted as the case 'all SAs cannot be transmitted' so as to ensure an appropriate level of capability using only one time SA transmission. Alternatively, the case in which 'UE cannot transmit SA' may be interpreted as the case in which 'SA cannot be transmitted a plurality of predetermined numbers of times'.

Hereinafter, it will be assumed that a specific UE intends to transmit SA in SA resource pool #2 but cannot transmit SA for the above reason or the like. In this case, another UE cannot recognize resource that is newly selected by the corresponding UE and, thus, an available operation may be stop of D2D data channel transmission up to a next SA period. However, when the corresponding UE intends to transmission resource in a current SA period while previously transmitting a D2D data channel, even if the SA is not transmitted, any problem does not arise with regard to at least UEs that previously receive SA of a corresponding UE. Under the assumption, when a UE that transmits a valid D2D data channel in a previous SA period intends to transmit SA in SA resource pool #2 but cannot transmit SA, the UE may not transmit new SA and may continue to transmit a D2D data channel according to previously transmitted SA.

When a plurality of SAs can be transmitted in SA resource pool #2, the case in which 'UE cannot transmit SA' may be interpreted as the case 'any one of SAs to be transmitted a plurality of numbers of times cannot be transmitted' the case in which 'all SAs cannot be transmitted', or the case in which 'SA cannot be transmitted a plurality of predetermined numbers of times'. However, in the two latter interpretations, at least some SAs are transmitted in SA resource pool #2 and, thus, when SA is transmitted even once in a SA resource pool, a D2D data channel may be transmitted according to newly transmitted SA.

As described above, when scheduling for signal transmission to an eNB is present or an SA resource pool is used for another purpose as necessary, even if SA transmission opportunity is lost, continuous D2D communication may be maintained. However, in any case, when transmission to an eNB is scheduled in an SA resource pool, partial SA transmission is inevitably lost and, thus, signal transmission to an eNB may not be scheduled in a subframe in which SA is transmitted.

Alternatively, in the case of partial failure in SA transmission, in particular, when one UE transmits one SA a plurality of numbers of times, transmission to an eNB may not be scheduled in the remaining SA periods if transmission to the eNB is not scheduled in at least front partial SA transmission period in order to prevent rear partial SA transmission from being disabled when front some SAs are transmitted. Based on this operation, assuming that SA is actually transmitted on all SA resources in which single SA content is repeated in an SA resource pool, a UE that receives specific SA may omit a procedure for determining whether separate partial transmission fails and attempt to receive SA. For example, the UE may couple signals of all SA resources in which single SA contents are repeated and attempt to decode SA at one time.

When an SA resource pool is used for another purpose, priority may be applied. For example, when an SA resource pool is used to transmit a D2D synchronization signal, resource of SA resource pool #1 may be preferentially used and, instead, an operation corresponding to the aforementioned case in which SA cannot be transmitted in SA resource pool #1 may be performed.

In particular, this method may be advantageous that only a period in which existing SA is retained is simply increased but an additional UE operation is not additionally used because new SA is not transmitted in SA resource pool #1. In addition, when resource of SA resource pool #2 is also used, it may not be possible to transmit new SA in a corresponding SA period and an operation corresponding to the aforementioned case in which SA cannot be transmitted in SA resource pool #2 may be performed.

Figure 14:
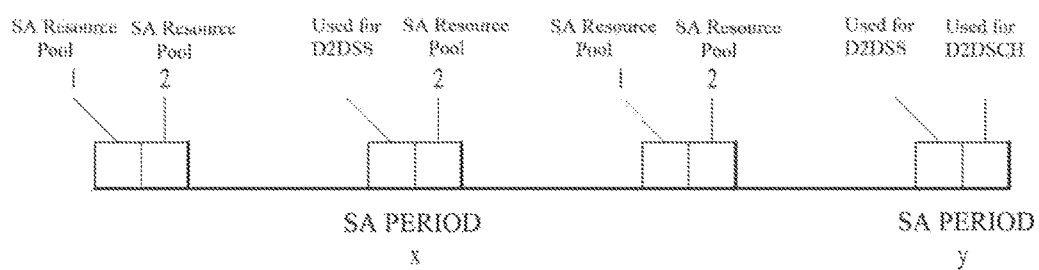
FIG. 14 is a diagram illustrating an example of transmitting D2DSS and a D2D synchronization channel (D2DSCH) according to an embodiment of the present invention.

FIG. 14 is a diagram illustrating an example of transmitting D2DSS and a D2D synchronization channel (D2DSCH) according to an embodiment of the present invention.

As seen from FIG. 14, a D2D synchronization signal (D2DSS) is transmitted using resource of SA resource pool #1 in an SA period x and D2DSS and D2D synchronization channel (D2DSCH) are transmitted using resource of SA resource pools #1 and #2 in an SA period y. In particular, under a configuration in which a D2DSS for acquisition of time/frequency synchronization is more frequently transmitted than a D2DSCH for transmitting other parameters for synchronization, it may be advantageous that resource is smoothly used by differentiating an SA resource pool and using resources while retaining overhead of transmission resource other than a D2D data channel every SA period.

The operation of dividing an SA resource pool into a plurality of resource pools of a plurality of SA resource pools #1 and #2 described with reference to FIGS. 11 to 14 may be extended to various cases other than a case associated with whether SA content is updated. For example, a used SA resource pool may be differently adjusted according to priority of D2D traffic.

It may be assumed that D2D traffic generated by a D2D UE is divided into class 1 and class 2 according to priority and class 1 has higher priority. In this case, a UE that transmits D2D traffic of class 1 may use SA resource pool #1 and a UE that transmit D2D traffic of class 2 may use SA resource pool #2. Accordingly, a D2D UE that intends to transmit class 2 D2D traffic with lower priority may detect SA for class 1 D2D traffic in SA resource pool #1 that first appears. Based on the detected SA, transmission of class 2 D2D traffic may be attempted using only resource that is not used in class 1 D2D traffic.

In this sense, the description given with reference to FIGS. 11 to 14 may be interpreted as if higher priority is applied to D2D transmission that does not update SA content than D2D transmission that updates SA content or newly transmit SA. Needless to say, this operation may also be applied to a case in which an SA resource pool is divided into more parts than two parts and may be extended such that D2D transmission with high priority uses an SA resource pool having a low index (as a result, which previously appears in a configuration illustrated in FIGS. 11 to 14). When class 1 is an uppermost class and class N is a lowermost class, D2D traffic of class k may use SA resource pool #k.

In the method of differently adjusting an SA resource pool to be used according to priority of D2D traffic, priority and the SA resource pool may be connected at an opposite order to the aforementioned operation while using the configuration of the SA resource pool described with reference to FIGS. 11 to 14. That is, SA may be first transmitted with respect to D2D traffic with low priority and then may be applied to D2D traffic with high priority using resource that is not used with respect to D2D traffic with low priority. That is, when class 1 is an uppermost class and class N is a lowermost class, D2D traffic of class k may use SA resource pool #(N−k+1).

When many D2D traffics with low priority occurs, a problem may arise in that resource usable by D2D traffic with high priority is not present or is highly limited. The problem may be overcome by additionally dividing a resource pool usable for data transmission according to priority. That is, a resource pool available during data transmission may also be divided into a plurality of parts as in the SA resource pool. In this case, when SA is transmitted in SA resource pool #m, priority of a corresponding D2D data channel may correspond to class (N−m+1). In addition, the corresponding SA may also use resource of data resource pool #x (x=1, 2, . . . m−1) usable by D2D traffic of lower class as well as data resource pool #m having the same index.

In particular, in the case of D2D traffic of class m, resource occupied by D2D with lower priority may be recognized from an SA resource pool with a lower index and, thus, available resource may also be selected without contention with D2D data with lower priority.

Figure 15:
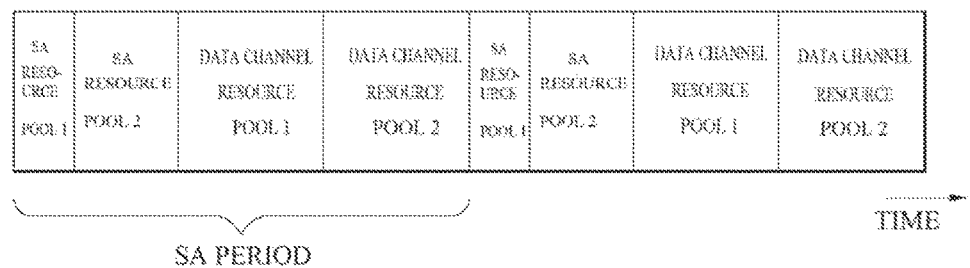
FIG. 15 is a diagram illustrating an example in which resource pools for an SA resource pool and a D2D data channel are configured based on priority of D2D traffic according to an embodiment of the present invention.

FIG. 15 is a diagram illustrating an example in which resource pools for an SA resource pool and a D2D data channel are configured based on priority of D2D traffic according to an embodiment of the present invention. In particular, in the case of FIG. 15, it may be assumed that two D2D traffic classes are present and an SA resource pool and a data resource pool are each divided into two parts.

Referring to FIG. 15, SA resource pool #1 may be used with respect to class 2 D2D traffic with lower priority and SA resource pool #2 may be used with respect to class 1 D2D traffic with higher priority.

Only data resource pool #1 is used with respect to class 2 D2D traffic that uses SA resource pool #1 but data resource pool #2 may be permitted to be used with respect to class 1 D2D traffic that uses SA resource pool #2 may also be permitted to use data resource pool #1 under a condition in which resource in which class 2 is not used is selected a search result in SA resource pool #1.

According to an order in which resource pools for an SA resource pool and a D2D data channel appear, when the resource pool first appears in the SA resource pool, resource pool may first appear in the D2D data channel as in FIG. 15 but this is a merely an example and may be embodied in various forms of combinations.

In this situation, when a specific UE1 transmits a D2D data signal of class 2, SA may be transmitted in SA resource pool #1 and D2D data may also use data resource pool #1. In this case, when another UE2 transmits a D2D data signal of class 1, the UE2 may detect SA of UE1 in SA resource pool #1, recognize resource to be used and, then select resource that is not used by UE1 in data resource pool #1 or transmit data using data resource pool #2.

The operation described with reference to FIG. 15 may also be effectively used when a class is divided according to operational capability of a UE. A UE corresponding to class 1 needs to have capability of detecting SA of another UE and recognizing resource of data to be used by another UE. In this case, the UE can many SAs and, thus, only some UEs may have the capability. A UE that does not have the capability needs to autonomously determine data resource while the UE does not detect SA of another UE and, thus, the UE cannot operate in class 1 and may operate in class 2. In particular, a legacy D2D UE generated before a resource determining method via SA detection is applied may operate only in class 2. Accordingly, class of the aforementioned D2D may be determined according to a data resource determining method of a transmission UE as well as priority of traffic. In addition, a relay UE that performs a relay operation of transmitting data of another UE to another UE or an eNB may have this capability and operate in class 1 that avoids contention but other UEs may operate in class 2.

In this situation, when UEs belonging to class 2 cannot recognize resource contention between the UEs, the UEs may determine data transmission resource using SA resource pool #1, and UEs belonging to class 1 may recognize a resource state of class 2 and select resource to avoid resource used by the UEs of class 2, thereby reducing overall D2D resource contention. Here, detection of SA of another UE may refer to a procedure of decoding an SA message transmitted by another UE and may be sufficient simply by recognizing whether SA is transmitted. Accordingly, when many SAs are determined to be transmitted, the detection may be embodied simply by limiting use of a resource pool for an associated D2D data channel.

As an example of the latter case (i.e., when detection of SA of another UE is merely a procedure of simply recognizing whether SA is transmitted), when it is determined that any SA is not transmitted in a specific SA resource pool, for example, when reception power of a reference signal of SA detected at all SA candidate positions is determined to be a predetermined reference value or less, a resourced pool for an associated D2D data channel may be considered and used as if any D2D transmission is not present. Accordingly, in this case, a decoding procedure of separate SA may not be necessary.

FIG. 16 is a block diagram illustrating a communication device according to embodiments of the present invention.

In FIG. 16, the communication device 1600 includes a processor 1610, a memory 1620, a Radio Frequency (RF) module 1630, a display module 1640, and a user interface (UI) module 1650.

The communication device 1600 is disclosed for illustrative purposes only and certain modules may also be omitted from the communication device 1600 as necessary. In addition, the communication device 1600 may further include necessary modules. Some modules of the communication device 1600 may be identified as more detailed modules. The processor 1610 is configured to carry out the operations of the embodiments of the present invention. For detailed operations of the processor 1610 reference may be made to FIGS. 1 to 15.

The memory 1620 is connected to the processor 1610, and stores an operating system, applications, program code, data and the like. The RF module 1630 is connected to the processor 1610 and converts a baseband signal into a radio frequency (RF) signal, or converts the RF signal into the baseband signal. For these operations, the RF module 1630 performs analog conversion, amplification, filtering, and frequency up-conversion in order or performs such operations in reverse order. The display module 1640 is connected to the processor 1610 and displays a variety of information. The scope or spirit of the display module 1640 of the present invention is not limited thereto, and the display module 1640 may be any of well-known elements, for example, a Liquid Crystal Display (LCD), a Light Emitting Diode (LED), an Organic Light Emitting Diode (OLED) and the like. The user interface (UI) module 1650 is connected to the processor 1610, and may be implemented as a combination of user interfaces such as a keypad, a touchscreen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

Although a method and apparatus for setting a resource pool for a scheduling allocation signal of device-to-device (D2D) communication in a wireless communication system has been described thus far in terms of an example applied to a 3GPP LTE system, the method and the apparatus may also be applied to various wireless communication systems other than the 3GPP LTE system.

The invention claimed is:

1. A method for transmitting scheduling assignment (SA) for device-to-device (D2D) communication by a user equipment (UE) in a wireless communication system, the method comprising:
 determining whether data to be transmitted is present using the D2D communication;
 determining whether the SA is transmitted according to a resource allocation mode for the D2D communication when the data is not present; and
 transmitting first SA when the resource allocation mode is a first mode,
 wherein the resource allocation mode comprises the first mode in which resource for the D2D communication is allocated by a base station and a second mode in which resource for the D2D communication is allocated according to arbitrary selection of the UE.

2. The method according to claim 1, further comprising transmitting second SA comprising information on resource for transmission of the data when the data is present,
 wherein the second SA comprises information on an identifier of a reception UE.

3. The method according to claim 2, wherein the first SA comprises information indicating that data transmission corresponding to the first SA is not present.

4. The method according to claim 2, wherein the second SA is repeatedly transmitted in a plurality of time resources and the first SA is transmitted one time in one time resource.

5. The method according to claim 1, wherein the UE does not transmit SA when the resource allocation mode is the second mode.

6. The method according to claim 1, further comprising transmitting dummy data through resource indicated by the first SA when the first SA is transmitted.

7. The method according to claim 1, wherein the determining of whether the SA is transmitted comprises:
 driving a predetermined timer upon determining that the data is not present; and
 determining whether the SA is transmitted according to a resource allocation mode for the D2D communication when the timer does not expire,
 wherein the UE does not transmit SA when the timer expires.

8. A method of transmitting scheduling assignment (SA) for device-to-device (D2D) communication by a user equipment (UE) in a wireless communication system, the method comprising:
 determining whether SA is transmitted in a previous SA period;
 determining whether resource for a data channel in a current SA period is changed when the SA is transmitted in the previous SA period; and
 transmitting the SA using resource of a first SA resource pool when the resource for the data channel is not changed,
 wherein, when the SA is not transmitted or the resource for the data channel is changed in the previous SA period, the SA is transmitted using resource of a second SA resource pool.

9. The method according to claim 8, further comprising transmitting the SA indicating termination of transmission of the data channel using the resource of the second SA resource pool when the transmission of the data channel is terminated.

10. The method according to claim 8, wherein the SA comprises information on whether the resource for the data channel is changed in a next SA period.

11. The method according to claim 8, wherein the SA comprises information on the number of SA periods in which the resource for the data channel is not changed.

12. The method according to claim 8, wherein the number of resources included in the second SA resource pool is greater than the number of resources included in the first SA resource pool.

13. The method according to claim 8, wherein the first SA resource pool precedes the second SA resource pool in a time region.

* * * * *